(12) United States Patent
Li et al.

(10) Patent No.: US 9,512,603 B2
(45) Date of Patent: Dec. 6, 2016

(54) FLUSHING MECHANISM

(75) Inventors: Feiyu Li, Xiamen (CN); Jian Li, Xiamen (CN); Laicong Hong, Xiamen (CN)

(73) Assignee: XIAMEN AXENT CORPORATION LIMITED, Xiamen (CN)

( * ) Notice: Subject to any disclaimer, the term of this patent is extended or adjusted under 35 U.S.C. 154(b) by 286 days.

(21) Appl. No.: 13/814,835

(22) PCT Filed: Aug. 10, 2011

(86) PCT No.: PCT/CN2011/078191
§ 371 (c)(1),
(2), (4) Date: Mar. 11, 2013

(87) PCT Pub. No.: WO2012/019537
PCT Pub. Date: Feb. 16, 2012

(65) Prior Publication Data
US 2013/0205486 A1 Aug. 15, 2013

(30) Foreign Application Priority Data

Aug. 10, 2010 (CN) .......................... 2010 1 0252463

(51) Int. Cl.
| | | |
|---|---|---|
| *E03D 1/34* | (2006.01) | |
| *E03D 3/10* | (2006.01) | |
| *F16K 17/04* | (2006.01) | |
| *F16K 17/06* | (2006.01) | |
| *F16K 31/143* | (2006.01) | |

(52) U.S. Cl.
CPC . *E03D 1/34* (2013.01); *E03D 3/10* (2013.01); *F16K 17/044* (2013.01); *F16K 17/065* (2013.01); *F16K 31/143* (2013.01)

(58) Field of Classification Search
CPC ......... E03D 1/34; E03D 1/142; E03D 1/306; E03D 5/024; E03D 3/10; F16K 17/044; F16K 17/065; F16K 31/143

USPC ............................................................. 4/378
See application file for complete search history.

(56) References Cited

U.S. PATENT DOCUMENTS

2010/0230625 A1* 9/2010 Li et al. ........................ 251/324

FOREIGN PATENT DOCUMENTS

| | | |
|---|---|---|
| CN | 201106202 Y | 8/2008 |
| CN | 201236375 | 5/2009 |
| CN | 101555700 A | 10/2009 |
| CN | 101892696 | 11/2010 |
| CN | 101906805 A | 12/2010 |
| CN | 101914940 A | 12/2010 |
| DE | 19633178 A1 | 2/1998 |
| WO | WO-0246540 A1 | 6/2002 |

* cited by examiner

*Primary Examiner* — Paul R Durand
*Assistant Examiner* — William R Klotz
(74) *Attorney, Agent, or Firm* — Rabin & Berdo, P.C.

(57) ABSTRACT

A flushing mechanism includes a housing with an outfall made at the housing bottom surrounding an axis; a guide rod with axial restraint relative to the housing along the axis; a first piston that hermetically slips on the cylindrical inner surface and guide rod at the same time along the axis direction; a spring loading the first piston installed in the upper cavity surrounding the guide rod; the second piston that hermetically slips on the guide rod along the axis direction and locates between the first piston and the housing bottom; a spring loading the second piston installed surrounding the guide rod; control valve; lower part of the first piston is provided with ring protuberance. The large seal ring of seal assembly of the second piston is sealed over the small seal ring of seal assembly of the second piston.

7 Claims, 12 Drawing Sheets

FLUSHING MECHANISM

TECHNICAL FIELD

Figure 1:
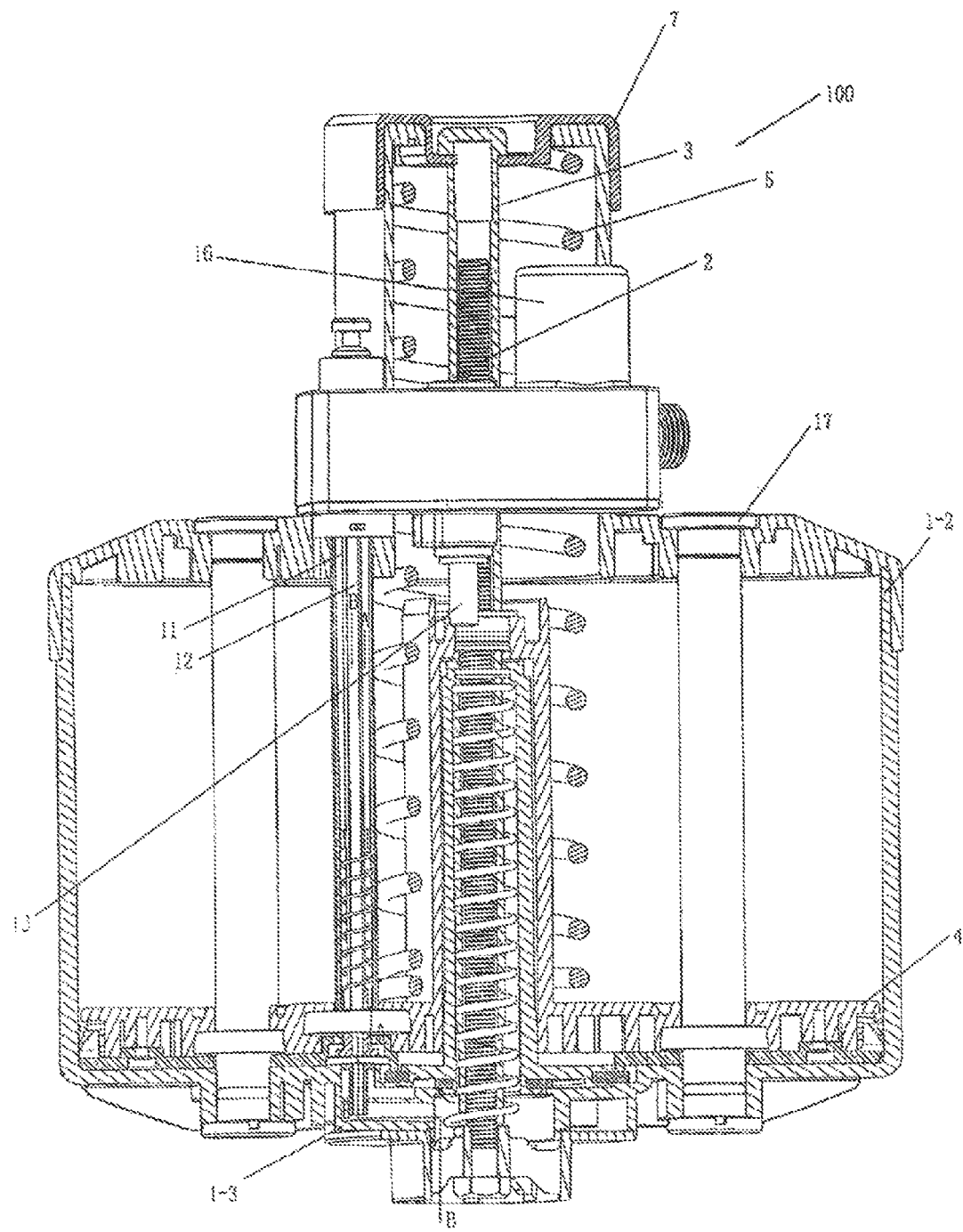

Generally speaking, the invention relates to a flushing mechanism for dirt and/or sewage flushing, in particular to a flushing mechanism for sanitary ware like flush toilet. In particular, the flushing mechanism utilizes the preloading, bending and deformation of a seal assembly to achieve complete sealing effect.

BACKGROUND TECHNOLOGY

The invention (Publication No.: CN200810091185.6) discloses a flushing mechanism for dirt and/or sewage flushing, which comprises a housing with an open upper part and a bottom part having an open mouth at the center. The inner side of the housing defines a plurality of cavities for storing water and accommodating parts. The lower part of the housing is arranged with a plurality of pipes that generate water passes respectively with the cavities defined by the housing; an upper cover, the lower part of which is connected with the housing; a guide rod, with a central line being penetrated through the cavities coinciding with the central line of the housing; a first piston comprising a bottom part with a central hole and a cylindrical part that outstretches to the periphery of the central hole from the bottom part of the first piston. The side of the bottom part of the first piston is arranged with a groove along the radical direction and the cylindrical part of the first piston is in a hollow shape, and the guide rod penetrates the cylindrical part of the first piston and the central hole of the bottom part of the first piston; a seal assembly of the first piston that locates in the groove at the side of the bottom part of the first piston, causing an up-and-down and reciprocating motion of the first piston along the inner wall of the housing in a hermetic manner; a spring loading the first piston, the end of which is fixed at the inner side of the upper cover top of the housing, and the other end of which is fixed on the upper surface of the bottom part of the first piston to apply force on the first piston; a second piston, comprising a bottom part with a central hole and a cylindrical part that outstretches to the periphery of the central hole from the bottom part of the second piston The cylindrical part of the second piston is in a hollow shape, and the guide rod penetrates the cylindrical part of the second piston and the central hole of the bottom part of the second piston; a spring loading the second piston arranged at the surrounding of the guide rod at the inner side of the hollow part of the cylindrical part of the second piston. One end of the spring loading the second piston is fixed at the inner side of the upper part of the cylindrical part of the second piston, and the other end is fixed on the fixed end of the guide rod, wherein, the spring loading the second piston further comprises a pressure-relief and/or bulletproof part that locates in the housing; and the outer periphery of the bottom part of the second piston and the periphery of the central hole are arranged with a seal assembly of the second piston; the seal assemblies of the first piston and the second piston consist of an inner sealing element and an outer sealing element, wherein, the inner sealing element has a spring element bended from a sheet metal and the outer sealing element has an O-ring. The bottom part of the second piston, the seal assembly of the second piston and the bottom part of the housing define an exterior lower cavity and an interior lower cavity, for cooperating with the spring loading the second piston in the course of the drainage, sequentially the second piston is moved upward and the outfall is opened.

The flushing mechanism has the disadvantages that the seal is not stable when the drainage completes and the product life is short.

CONTENT OF INVENTION

Based on the disadvantages of the prior art, the invention aims at providing a flushing mechanism for dirt and/or sewage flushing, in particular to a flushing mechanism for sanitary ware like flush toilet. In particular, by utilizing the preloading, bending and deformation of a seal assembly, the flushing mechanism completely drains the pressurized water out of the exterior lower cavity during course of drainage. What's more, the preloading, bending and deformation of the seal assembly in the invention also increase the stability and extend the life of the product.

Based on one aspect of the invention, the flushing mechanism for realizing the purpose comprises a housing having a housing wall and a housing bottom that integrates or connects with the housing wall as a whole. The housing wall defines a cylindrical inner surface that surrounds an axis; and an outfall is provided on the housing bottom that surrounds the axis to connect to a wash pipe;

A guide rod with axial restraint relative to the housing along the axis;

A first piston that hermetically slips on the cylindrical inner surface and the guide rod at the same time along the axis direction, wherein, the first piston divides the inner cavity surrounded by the cylindrical inner surface into a lower cavity contacting with the housing bottom and a relative upper cavity;

A spring loading the first piston installed in the upper cavity surrounding the guide rod, which directly or indirectly implies elastic force on the first piston from the housing and drives the first piston to move downward, thus reducing the volume of the lower cavity and expanding the volume of the upper cavity;

A second piston that hermetically slips on the guide rod along the axis direction, which locates between the first piston and the housing bottom;

A spring loading the second piston installed surrounding the guide rod, which directly or indirectly implies elastic force on the second piston from the housing and drives the second piston to move upward;

A control valve;

The control valve is characterized in that the second piston has a seal assembly.

The seal assembly of the second piston comprises a large seal ring surrounding the outboard of the bottom and a small seal ring locating at the central part. The lower part of the first piston is provided with a ring protuberance, which contacts with the large seal ring of the seal assembly of the second piston. When the first piston slips downward, the ring protuberance causes the preloading, bending and deformation of the large seal ring of the seal assembly of the second piston. The large seal ring of the seal assembly of the second piston is preferably sealed over the small seal ring due to the preloading, bending and deformation, thus facilitating the water in the exterior lower cavity to flow out from the outfall.

The ring protuberance can be formed integrating with the first piston.

The ring protuberance can be installed at the lower part of the first piston.

The lower part of the first piston can be arranged with a block bar having a through hole at the center. The periphery of the through hole stretches downward and generates the ring protuberance.

The first bypass of the flushing mechanism is installed inside the housing bottom.

The housing bottom and the outfall generate a bench hole comprising a bench table and a columnar hole.

A second bypass is led from the control valve wash pipe leading to the outfall and opening to the wash pipe.

The second bypass of the flushing mechanism is installed inside the housing bottom.

The first piston comprises a top part of first piston that hermetically slips surround the guide rod along the axis direction and a cylindrical part of first piston that connects the top part and the bottom part of first piston into a whole. The spring loading the first piston surrounds the cylindrical part of the first piston and directly contacts the bottom of the first piston to apply the spring force.

The second piston comprises a bottom part of the second piston, a top part of the second piston that hermetically slips surround the guide rod and a cylindrical part of the second piston that connects the top part and the bottom part of the second piston into a whole. The cylindrical part of the second piston can be inserted into the cylindrical part of the first piston from the lower cavity. The spring loading the second piston is located between the guide rod and the cylindrical part of the second piston.

The guide rod comprises a sleeve that defines an axial screw hole and a screw that can be screwed in to the screw hole. When one end of the screw is screwed into the screw hole from one end of the sleeve, the other ends of the screw and the sleeve push and block two ends of a coil spring in relaxed state looping the sleeve and the screw respectively; and continuous compressing the spring is realized by keeping on screwing the screw into the sleeve.

As the lower part of the first piston is provided with a ring protuberance capable of contacting with the ring protuberance for large seal ring of the seal assembly of the second piston, when the first piston in the invention slips downward, the first piston and the second piston contact with each other under the effect of the spring loading the first piston and the spring loading the second piston, causing the bending and deformation of the periphery part of the large seal ring of the seal assembly of the second piston due to the backstop of the ring protuberance; therefore, the lower edge of the large seal ring is lower than the lower edge of the small seal ring and the large seal ring moves downward together with the small seal ring. The large seal ring of the seal assembly of the second piston is preferably sealed over the small seal ring due to the preloading, bending and deformation, thus facilitating the water in the exterior lower cavity to flow out from the outfall.

DESCRIPTION OF ATTACHED FIGURES

Now, taking the flush toilet as example, the invention is described in detail below in combination with the embodiment shown in the attached figures. In all attached figures, the same parts are illustrated in the same signs.

Figure 2:
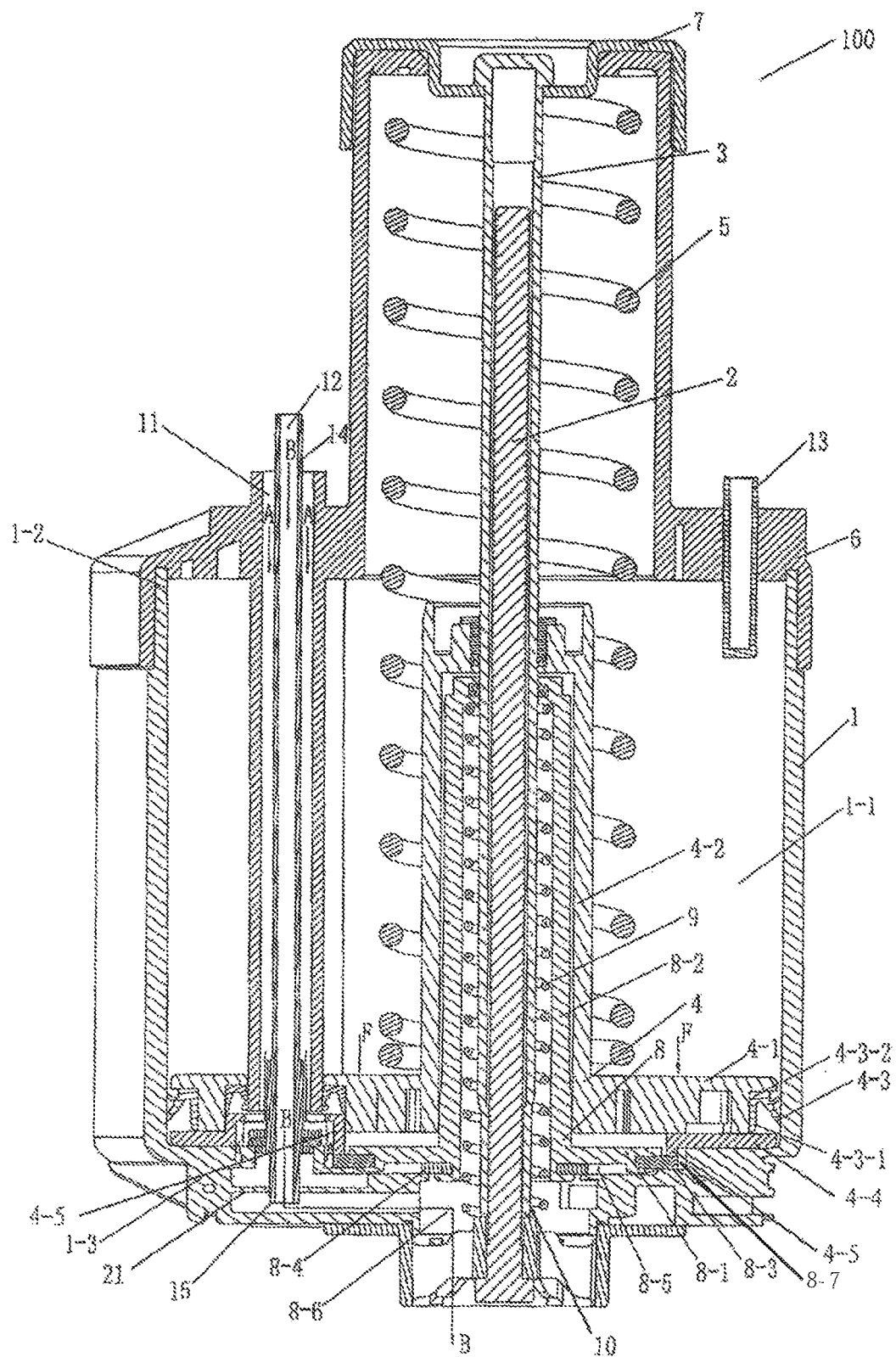
Figure 3:
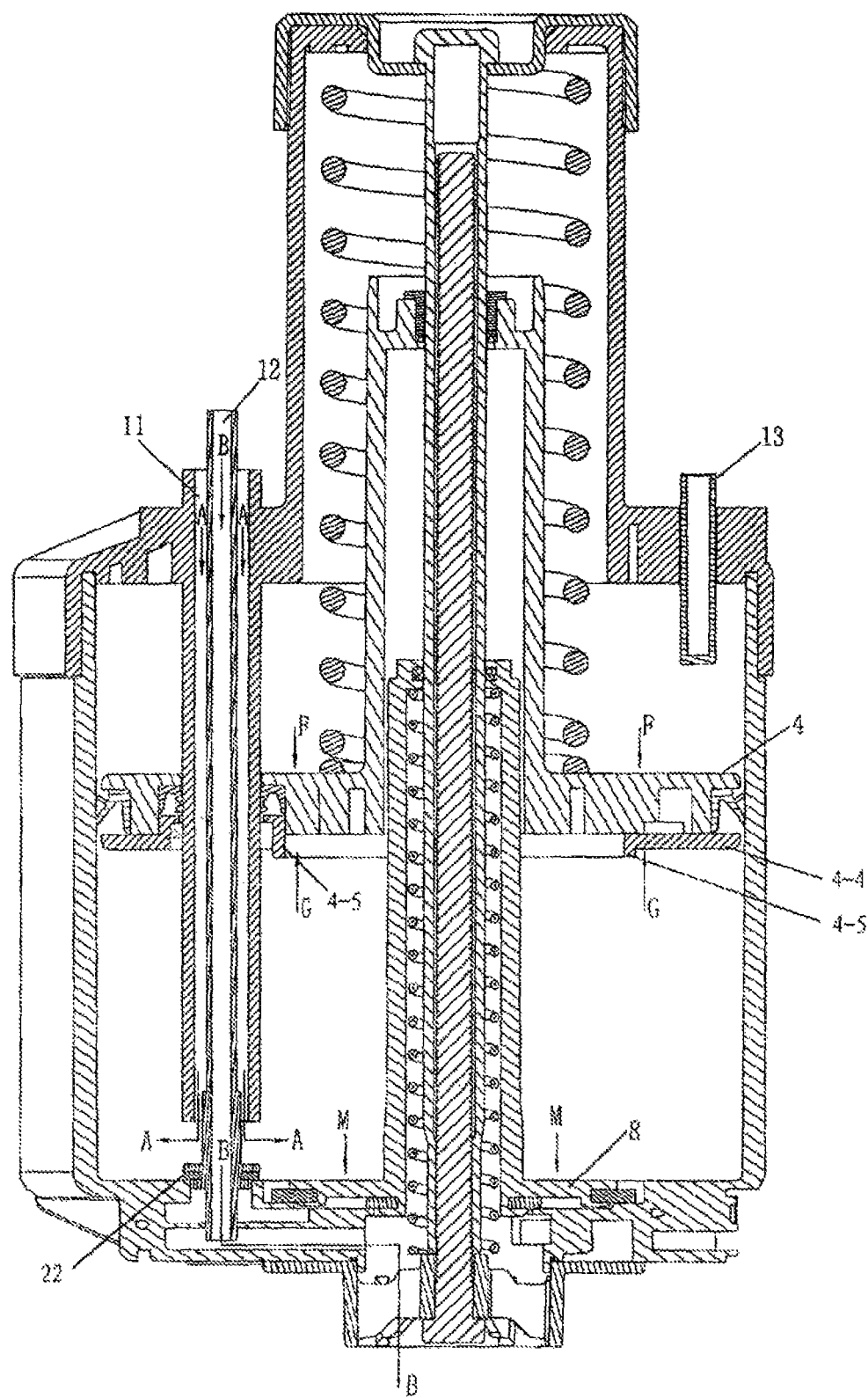
Figure 4:
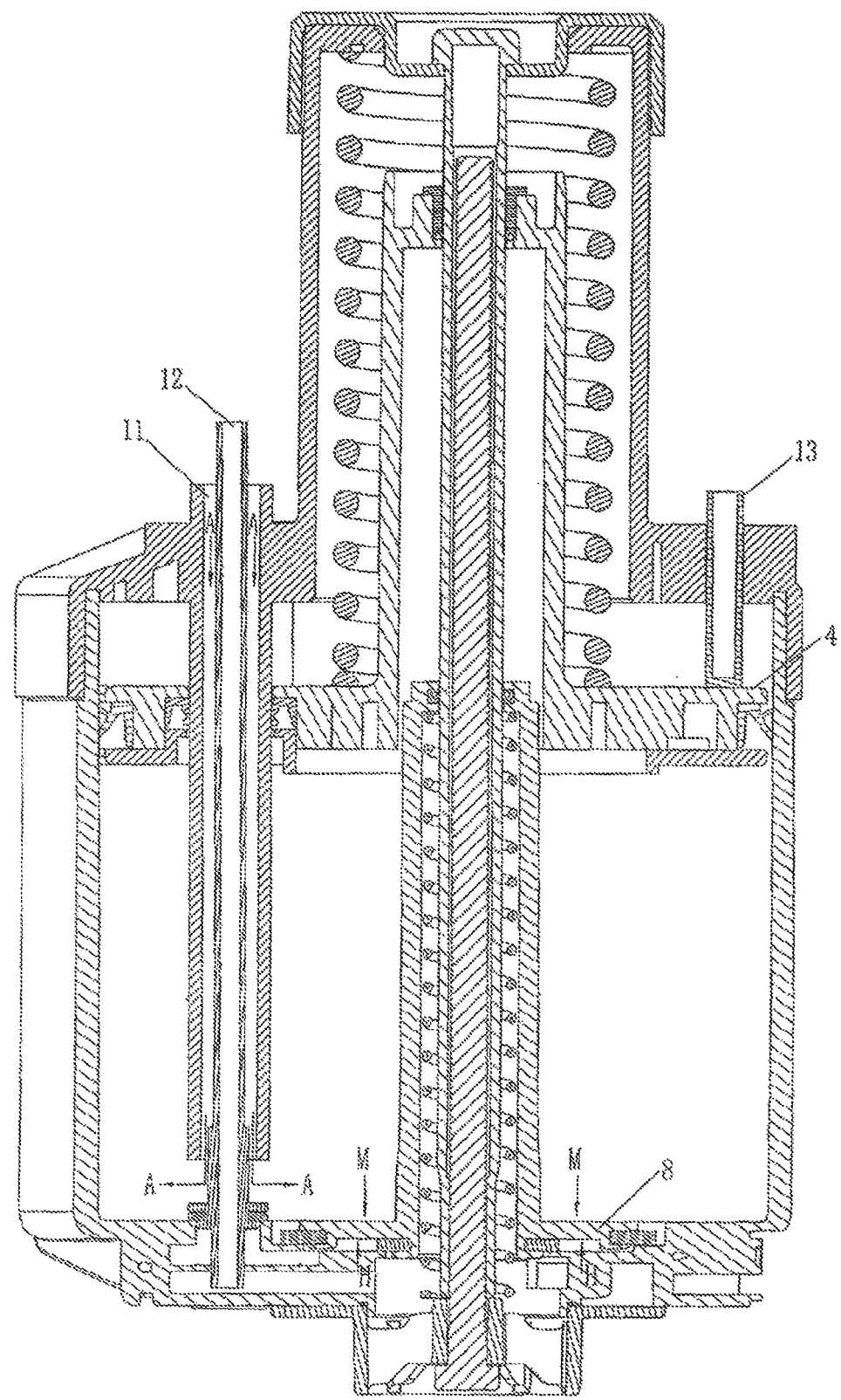
Figure 5:
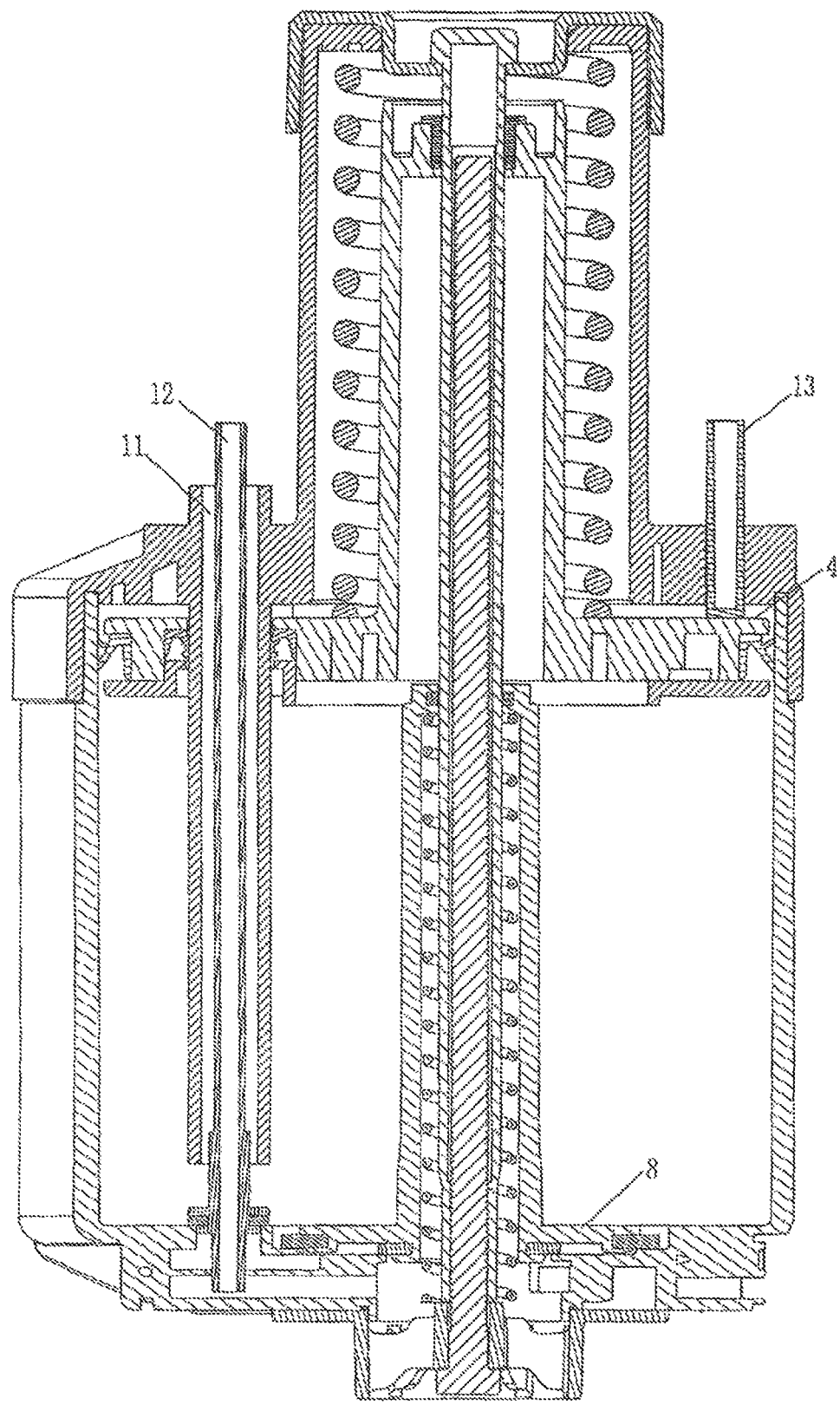
Figure 6A:
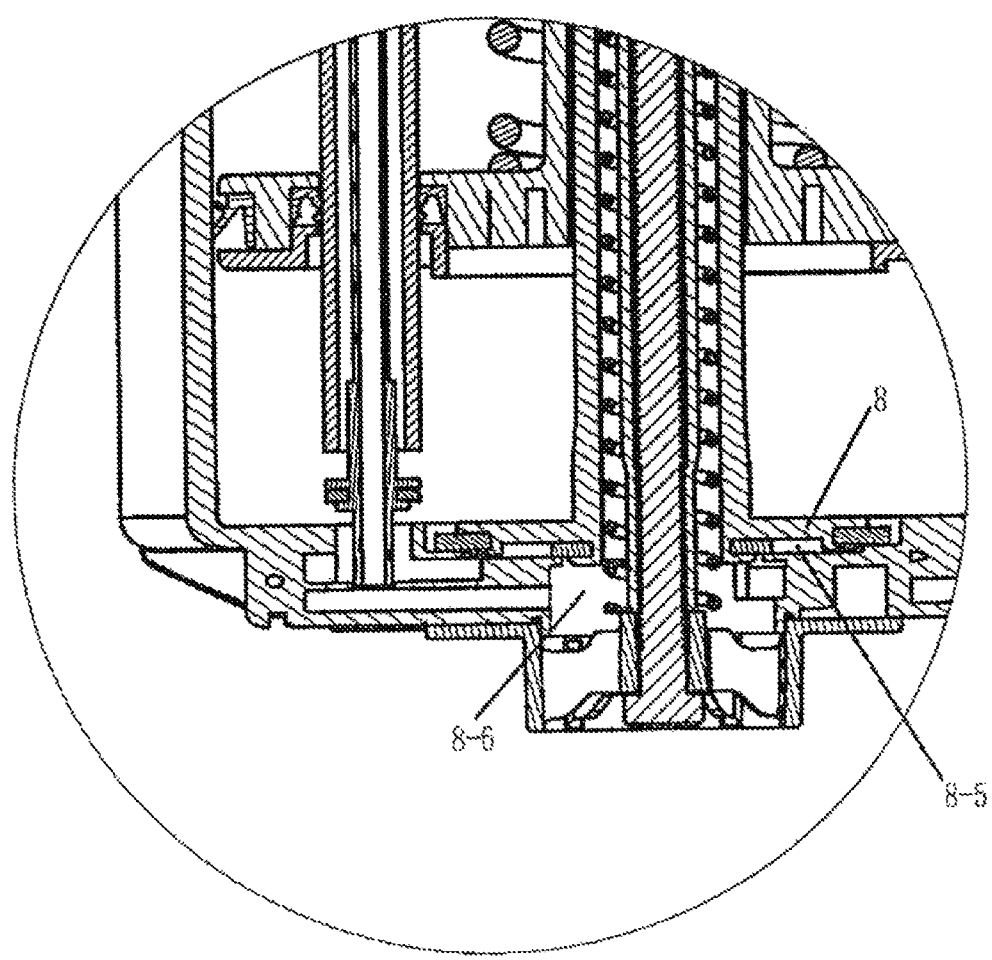
Figure 6B:
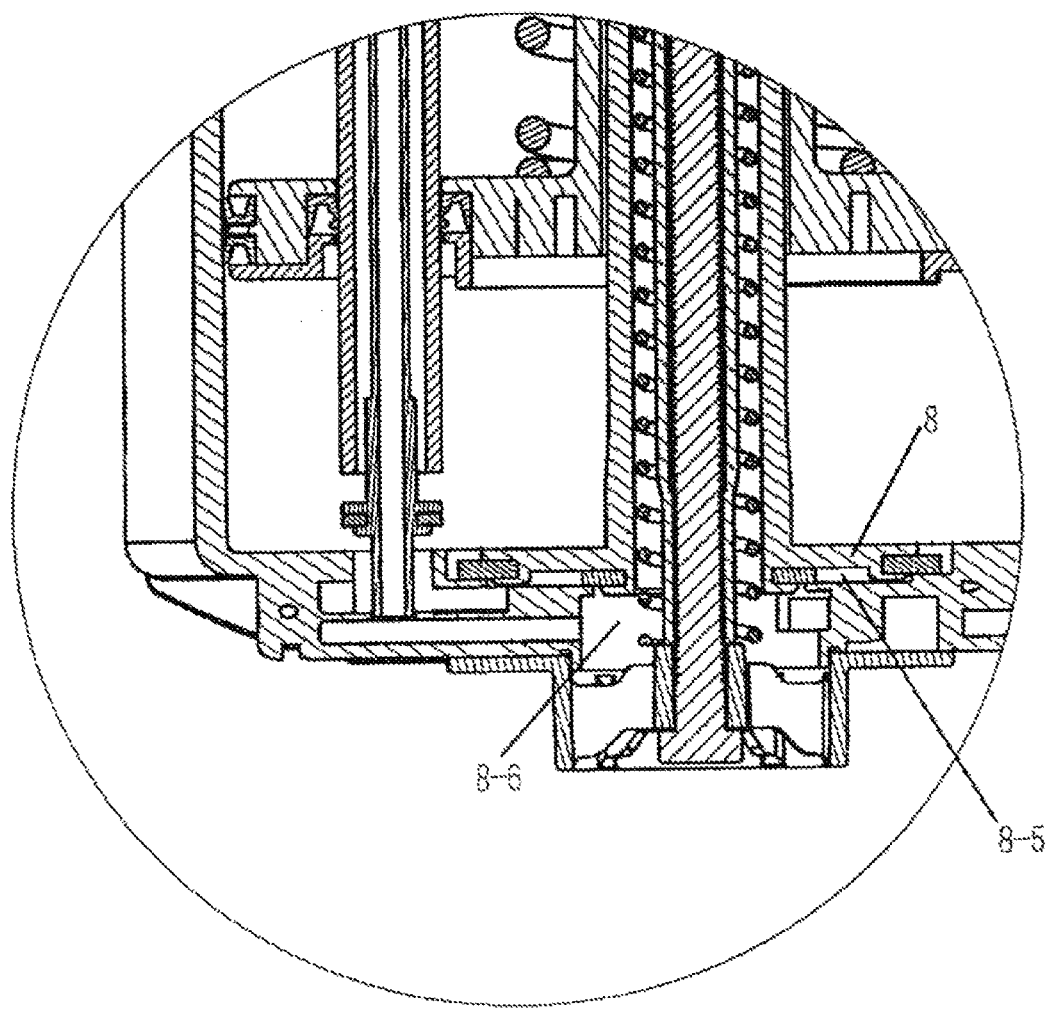
Figure 6C:
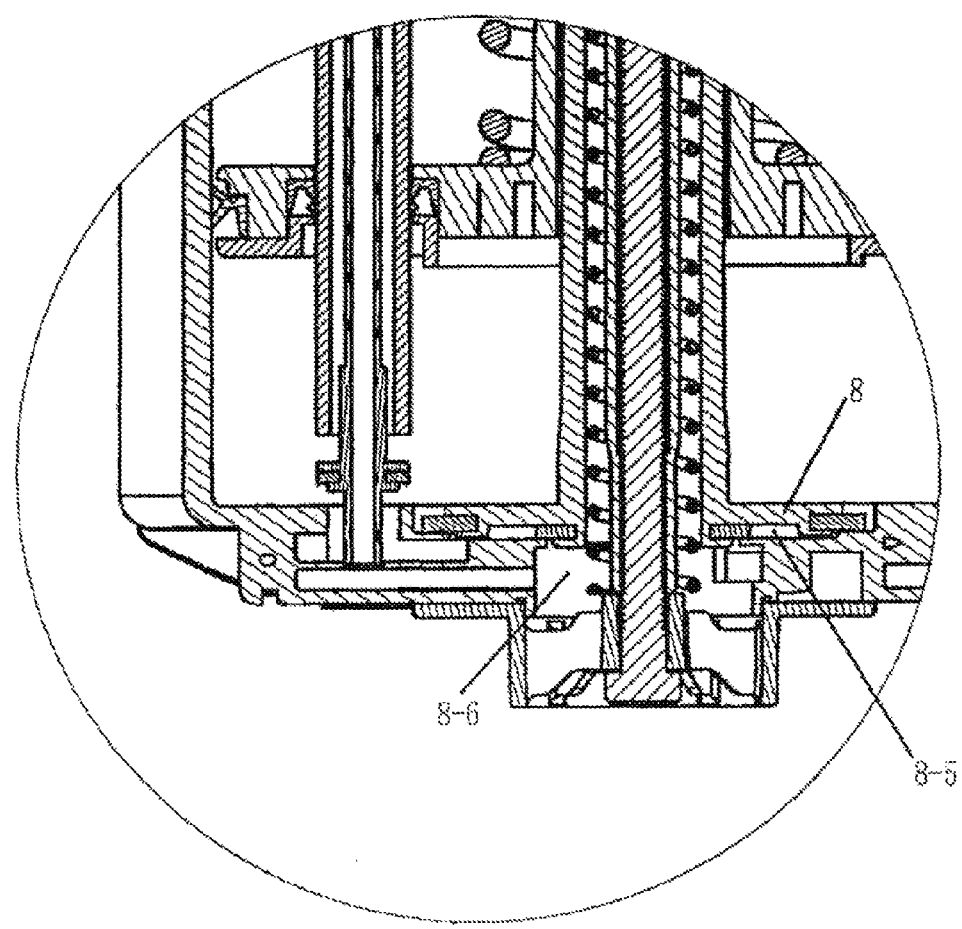
Figure 6D:
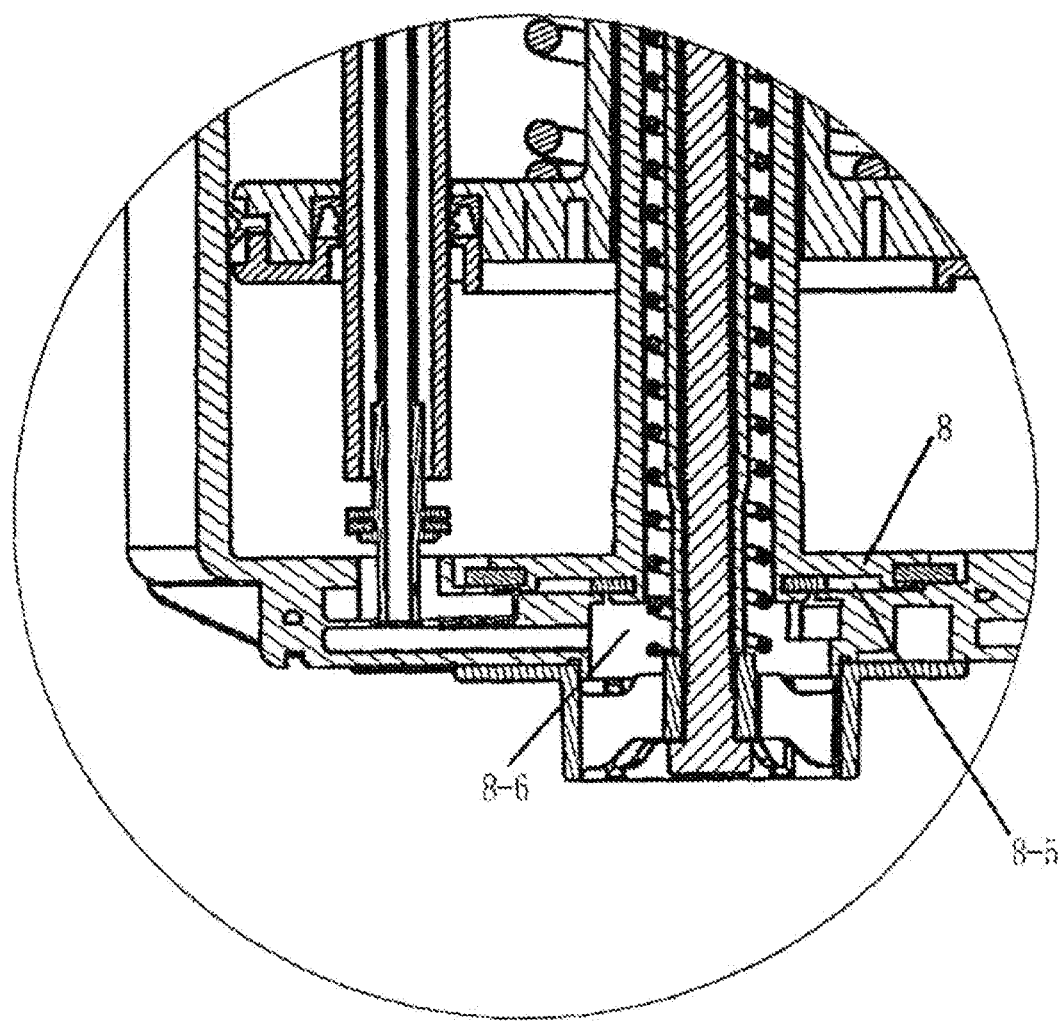
Figure 7:
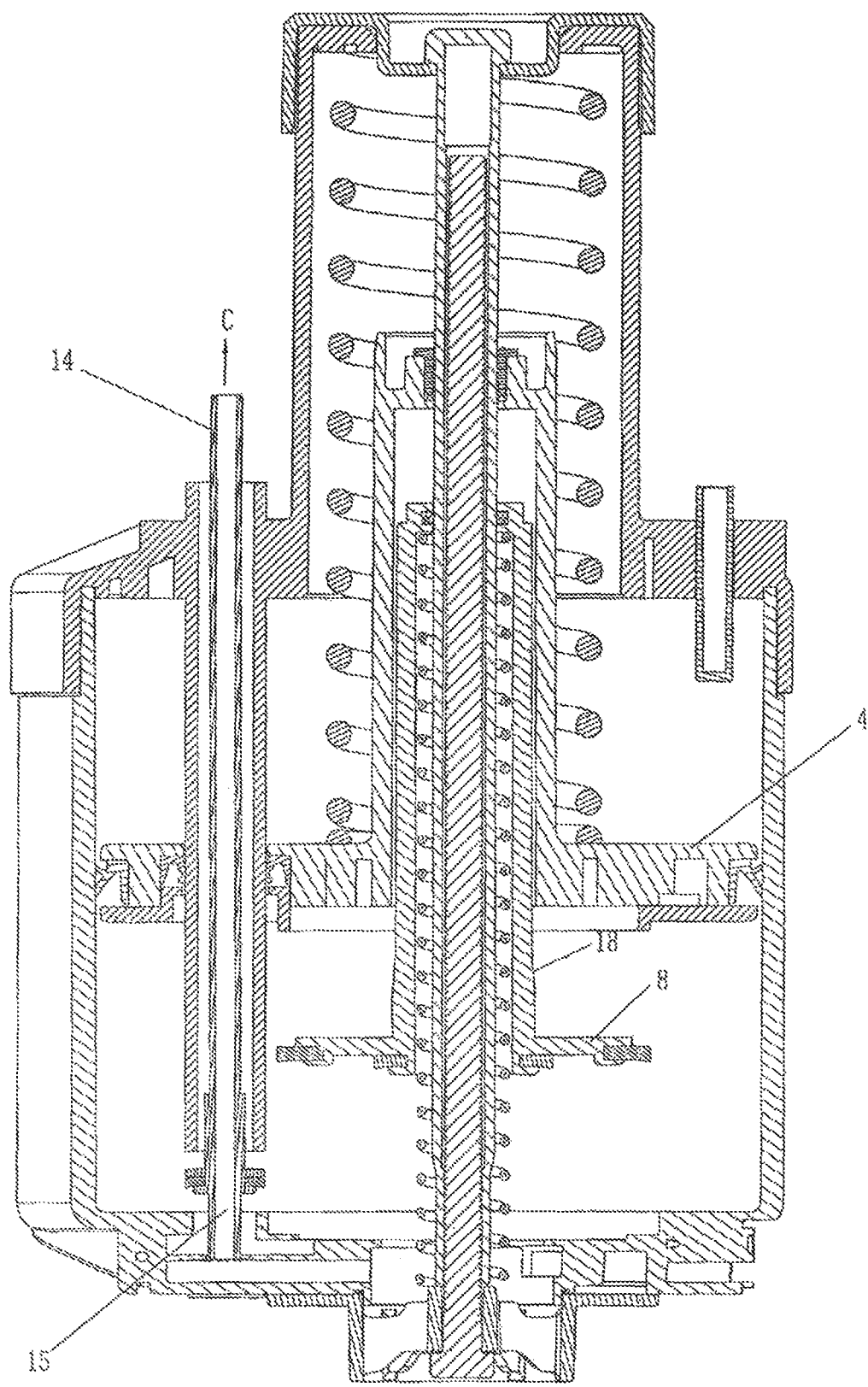
Figures 8A, 8B, 8C:
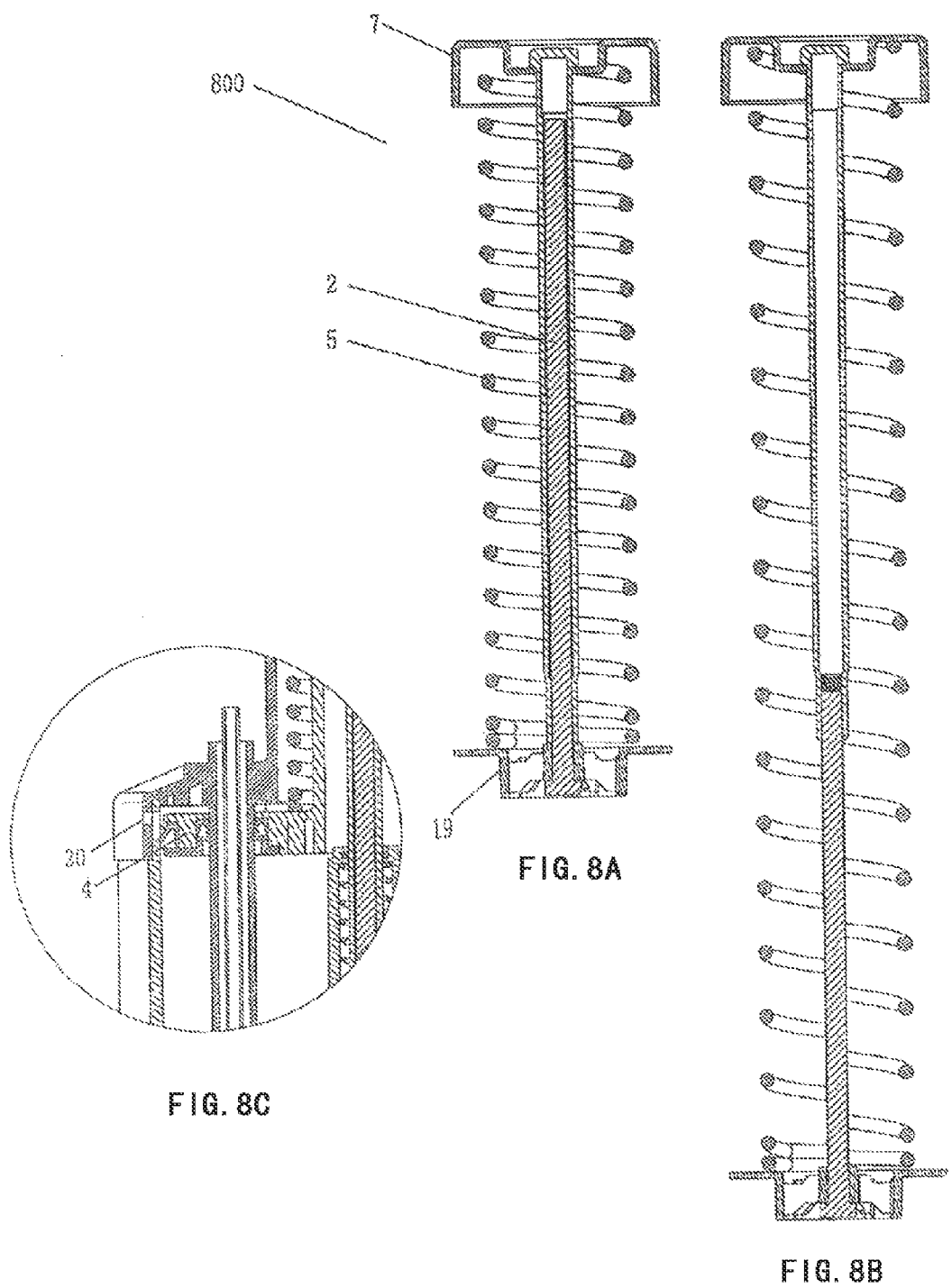

FIG. 1 illustrates the arrangement of the inner parts of the flushing mechanism in the invention;

FIG. 2 schematically illustrates the situation of the second piston at the initial stage;

FIG. 3 schematically illustrates the status of the first piston and the second piston during the water inflow and water supplement stages;

FIG. 4 schematically illustrates the status of the water supply channel, the water supplement channel, the first piston and the second piston during the water inflow stage and after the water supplement;

FIG. 5 schematically illustrates the status of the first piston and the second piston as well as the connecting condition of each channel in the housing after the water inflow stage;

FIGS. 6 A-6 D partly illustrate the status of the first piston and the second piston as well as the connecting condition of each channel in the housing and the different embodiment of the seal assembly of the first piston when lifting up the control valve for drainage;

FIG. 7 schematically illustrates the situation of the first piston and the second piston as well as the connecting condition of each channel in the housing during the drainage stage;

FIGS. 8 A-8 C illustrate the pressure-relief and/or bullet-proof part of the invention, wherein, FIG. 8 A is the structural diagram of the spring limit unit; FIG. 8 B is the schematic diagram for the gradual release of energy by the spring when dismantling the screw; and FIG. 8 C schematically illustrates the setting position of the unloading port; and FIG. 9 partly illustrates the arrangement of first piston, the second piston and the seal assembly of the first piston in the Embodiment 2 of the invention.

DETAILED DESCRIPTION OF THE PREFERRED EMBODIMENTS

Now, taking the embodiment of the flush toilet for example, the invention is described in detail below.

In Embodiment 1, the perspective of FIG. 1 illustrates inner parts of the flushing mechanism 100 in the invention; and FIG. 2 illustrates the situation of the second piston at the initial stage. Referring to FIG. 1 and FIG. 2, the flushing mechanism of the invention comprises a housing 1, having a housing wall 1-2 and a housing bottom 1-3 that integrates or connects with the housing wall as a whole and an inner cavity 1-1 of for storing water and accommodating inner parts of the flushing mechanism 100. The housing wall defines a cylindrical inner surface that surrounds an axis; and an outfall is provided on the housing bottom that surrounds the axis to connect to a wash pipe. A separator 21 is provided inside the housing bottom of the housing 1 to generate water pipes in the cavity 1-1, i.e. the water bypass; a guide rod with axial restraint relative to the housing 1 along the axis; the guide rod comprises a screw 2, which is arranged in the cavity 1 coinciding with the central line of the housing 1 along the vertical direction. The guide rod also comprises a sleeve 3 that defines an axial screw hole and the screw 2 can be screwed in to the screw hole; the first piston 4 can hermetically slip on the cylindrical inner surface and the guide rod at the same time along the axis direction. The housing also comprises a top part of the first piston that hermetically slips surrounding the sleeve 3 along the axial direction, a bottom part 4-1 of the first piston having a central hole and a cylindrical part 4-2 of the first piston that connects the top part and the bottom part of the first piston into a whole outstretching to the periphery of the central hole from the bottom part 4-1 of the first piston. The external diameter of the bottom part of the first piston 4-1 is slightly smaller than the external diameter of the housing 1. The first piston 4 divides the inner cavity 1-1 surrounded by the cylindrical inner surface into a lower cavity 8-6 contacting with the housing bottom and a relative upper cavity. At least one groove is provided at the side of the bottom part 4-1 of the first piston. The seal assembly 4-3 of the first piston is inside the groove. Due to the seal assembly 4-3 of the first piston, the first piston 4 and the housing 1 can take an up-and-down and reciprocating motion. The lower part of the first piston 4 is provided with a ring protuberance 4-5. In addition, the first piston 4, along with the central line, is arranged surrounding the guide rod. The cylindrical part 4-2 of the first piston 4 is in a hollow shape, and the screw 2 and the sleeve 3 penetrate the cylindrical part 4-2 of the first piston and the central hole of the bottom part 4-1 of the first piston; the spring loading the first piston 5 is arranged surrounding the sleeve 3 and the cylindrical part 4-2 of the first piston 4, having one end fixed at the inner side of the upper part of the housing upper cover 6, and the other end on the upper surface of the bottom part 4-1 of the first piston 4, which directly or indirectly implies elastic force on the first piston 4 from the housing 1 and drives the first piston to move downward, thus reducing the volume of the lower cavity and expanding the volume of the upper cavity; a control valve (15); an upper cover 6 having a shape suitable for surrounding the spring loading the first piston 5 and fixing the spring loading the first piston 5 on the upper end. A top cover 7 is arranged on outer side of the top part of the upper cover 6 in the housing to seal the upper part of the upper cover 6 of the housing. The sleeve is fixed on the upper cover 6 of the housing. And the lower part of the upper cover 6 in the housing is integrated with the housing 1 as a part of the housing 1. Besides, the upper cover 6 is provided with a plurality of through holes to pass through such parts as travel switch of water level 13.

As an alternative, the flushing mechanism also comprises a second piston 8, having a top part of the second piston sliding sealed with the sleeve 3, a bottom part 8-1 of the second piston with a central hole and a cylindrical part 8-2 of the second piston that outstretches to the periphery of the central hole from the bottom part 8-1 of the second piston and connects the top part of the second piston and the bottom part 8-1 of the second piston as a whole. The cylindrical part 8-2 of the second piston is in a hollow shape. The screw 2 and the sleeve 3 penetrate through the cylindrical part 8-2 of the second piston and the central hole of the bottom part 8-1 of the second piston. The second piston locating between the first piston and the housing bottom hermetically slips on the sleeve 3 along the axis direction. A large seal ring 8-3 for the seal assembly of the second piston is provided surrounding the outboard of the bottom part 8-1 of the second piston. And a small seal ring 8-4 for the seal assembly of the second piston is positioned surrounding the central hole of the bottom part 8-1 of the second piston.

The cylindrical part 8-2 of the second piston comprises an axial upper section and an axial bottom section 18. The axial upper section is in clearance fit with the cylindrical part 4-2 of the first piston and the axial bottom section is in frictional sliding fit with the cylindrical part 4-2 of the first piston.

The cylindrical part 4-2 of the first piston is in clearance fit with the cylindrical part 8-2 of the second piston to ensure free relative axial movement between them.

The ring protuberance can be formed integrating with the first piston.

The ring protuberance can be installed at the lower part of the first piston.

The lower part of the first piston can be arranged with a block bar 4-4 having a through hole at the center. The periphery of the through hole stretches downward and generates the ring protuberance 4-5.

Similar to the first piston 4, the second piston 8 is arranged with a spring loading the second piston 9, which is capable to arrange the spring on the periphery of the sleeve 3 at the inner side of the cylindrical part 8-2 of the second piston, and one end of the spring loading the second piston 9 is fixed at the inner side of the top part of the cylindrical part 8-2 of the second piston and the other end is fixed at the end 10 of the sleeve 3, which directly or indirectly implies elastic force on the second piston 8 from the housing and drives the second piston to move upward.

The flushing mechanism has the following three working statuses:

Under the first status, the first piston 4 pushes downward the second piston 8 to cause the periphery of the large seal ring against the housing bottom, therefore, a ring exterior lower cavity 8-5 surrounding the axis is generated between the housing bottom and the second piston 8. The ring exterior lower cavity seals the lower cavity with each other and is communicated with the outfall.

Under the second status, the lower cavity is filled with water to separate the first piston from the second piston (see FIG. 3), and the second piston, under the water pressure, overcomes the upward acting force from the spring loading the second piston 9 and leans against the housing bottom. The ring exterior lower cavity 8-5 closes with the outfall and the lower cavity.

Under the third status, the lower cavity is communicated with the ring exterior lower cavity 8-5 with a first bypass and the control valve 15. The upward acting force from the spring loading the second piston 9 drives the second piston 8 away from the housing bottom (see FIG. 7). Therefore, the lower cavity, the ring exterior lower cavity 8-5 and the outfall are communicated with each other. And the water in the lower cavity is drained from the outfall under the pressure of the first piston 4. The control valve 15 closes the first bypass, and at the same time or after that, the first piston 4 and the second piston 8 return to the first status The invention is characterized in that the lower part of the first piston is provided with a ring protuberance 4-5 capable of passing through an annular opening 8-7 in the bottom of the second piston to contact the large seal ring 8-3 of the seal assembly of the second piston. When the first piston in the invention slips downward, the ring protuberance 4-5 causes the preloading, bending and deformation of the large seal ring of the seal assembly of the second piston. The large seal ring 8-3 of the seal assembly of the second piston is preferably sealed over the small seal ring 8-4 of the seal assembly of the second piston due to the preloading, bending and deformation, thus facilitating the water in the ring exterior lower cavity 8-5 to flow out of the outfall.

The first bypass of the flushing mechanism is installed inside the housing bottom.

The housing bottom and the outfall generate a bench hole surrounding the axis.

The bench hole comprises a bench table and a columnar hole. The exterior lower cavity is on the bench table of the bench hole.

The ring exterior lower cavity is collectively defined by the second piston, the bench table of the bench hole, and the seal between the second piston and the outfall and the columnar hole.

As shown in FIG. 3, a second bypass is led from the control valve 15 leading to the outfall and opening to the wash pipe.

The second bypass of the flushing mechanism is installed inside the housing bottom.

As shown in FIGS. 8 A and 8 B, when one end of the screw 2 is screwed into the screw hole from one end of the sleeve 3, the other end of the screw and the sleeve push and block two ends of a coil spring in relaxed state looping the sleeve and the screw respectively; and continuous compressing of the spring is realized by keeping on screwing the screw into the sleeve.

In addition, the flushing mechanism also comprises a bulletproof guiding element 17 to guide the piston 4 to take an up-and-down and reciprocating motion. To simplify and compact the structure, the guiding element 17 is in a pipe shape. In addition, the flushing mechanism is also provided with a water supply channel 11 and a water supplement channel 12, which is capable to set the water supply channel 11 and the water supplement channel 12 along with the central line to save space. To simplify and compact the structure, it is preferable to arrange the control valve rod 14 of the control valve 15 and the water supply channel 11 and the water supplement channel 12 along with the central line.

In addition, the flushing mechanism 100 preferably also comprises a travel switch of water level 13. As mentioned above, the control valve rod 14, the water supply channel 11 and the water supplement channel 12 as well as the travel switch of water level 13 can pass through the upper cover 6 of the housing to reach the inner side of the housing 1.

The lower part of the housing 1 is provided with an outfall flange 19 (see FIG. 8 A) for drainage.

The flushing mechanism also comprises a part 16 for stabilizing the water pressure.

As shown in FIG. 8 C, the flushing mechanism also comprises a pressure-relief part, which may be at least one pressure-relief opening 20 arranged at the top dead center along the upper periphery of the housing 1 that is slightly higher than the first piston 4. If the travel switch of water level 13 fails, the first piston 4 continues to move upward to the pressure-relief opening 20, and the water is drained from the pressure-relief opening 20, thus preventing the housing from being broken up by the pressure of water supply.

Now, a detailed description is given below for the motion of each part in the embodiment of the invention with the attached figure.

Refer to the Attached FIG. 2, which schematically illustrates the status of the first piston 4 and the second piston 8 at the initial position. As FIG. 2 shown, at initial position, the water in the cavity 1-1 is drained out. At this time, the bottom part 4-1 of the first piston, under the force of the spring loading the first piston 5, is located at the lowest position (the bottom dead center). The second piston 8, under the downward pressure of the first piston 4, also remains at the lowest position, and the exterior lower cavity 8-5 of the second piston 8 is sealed. The inner pressure is atmospheric pressure and the inner pressure of the interior lower cavity 8-6 is also atmospheric pressure. The outfall is closed and the water supply channel 11 and the water supplement channel 12 and the related parts are closed. At the initial stage, the cavity 1-1 is communicated with the atmosphere, and the upper surface of the bottom part 4-1 of the first piston is impacted by the atmospheric pressure. At this time, the resultant force applying on the surface of the bottom part 4-1 of the first piston is F.

Refer to the Attached FIG. 3, which schematically illustrates the status of the first piston 4 and the second piston 8 at the water inflow and water supplement stages. Referring to FIG. 3, controlled by the travel switch of water level 13, the water supply channel 11 and the water supplement channel 12 are communicated with the water supply source (not illustrated) and a flow enters the housing 1 through the water supply channel 11, as Arrow A-A shown, while the other flow enters into the trap of the toilet through the water supplement channel 12, as Arrow B-B shown. At this time, the acting force G from the water pressure of the pipe acted on the first piston 4 is larger than the resultant force F of the atmospheric pressure in the spring loading the first piston 5 and the cavity 1-1, thus causing the first piston 4 to move upward. And the acting force M from the water pressure applied on the bottom part 8-1 of the second piston 8 is larger than the upward force H on the spring loading the second piston 9, thus causing the second piston 8 to remain at the lowest position.

Refer to the Attached FIG. 4, which schematically illustrates the status of the first piston 4 and the second piston 8 during the water inflow and after the water supplement stages. Referring to FIG. 4, the first piston 4 moves upward, thus pushing the travel switch of water level 13 to move a certain distance. The travel switch of water level 13 closes the access between the water supplement channel 12 and the water supply source (not illustrated) and stops supplying the water supplement channel 12. At this time, the water supply channel 11 is still communicated with the water supply source (not illustrated) and continues to supply the water, as Arrow A-A shown. The second piston 8, impacted by the force M, overcomes the upward force from the spring loading the second piston 9 and remains at the lowest position.

Refer to the Attached FIG. 5, which schematically illustrates the status of the first piston 4 and the second piston 8 in the washing mechanism 100 after the water inflow stage. Referring to FIG. 5, the first piston 4 continues to move upward, thus pushing the travel switch of water level 13 to move a certain distance. The access between the water inflow channel 11 and the water supply source (not illustrated) is closed, thus stopping supplying water to the inflow channel 11. At the same time, the access between the water supplement channel 12 and the water supply source (not illustrated) is not communicated and the water supply is completed. The housing 1 is filled up with a quantity of water as preset. At this time, the spring loading the first piston 5 is compressed to save energy. An upward thrust is generated under the water pressure in the housing 1. The thrust is equivalent to downward elasticity on the spring loading the first piston 5, thus causing the first piston 4 to remain at the top dead center. And the second piston 8, impacted by the force M, remains at the lowest position.

Refer to Attached FIG. 6, which partly illustrates the status of the first piston 4 and the second piston 8 as well as the communicating condition of each channel in the housing 1 when lifting up the control valve rod 14 for drainage. FIG. 7 schematically illustrates the situation of the first piston 4 and the second piston 8 as well as the communicating condition of each channel in the housing 1 during the drainage stage.

As FIG. 6 and FIG. 7 shown, when the urinal is to be flushed, the button (not illustrated) is pressed; the control valve lever 14 is lifted upward along the direction of Arrow C through the connecting rod reversing device (not illustrated); the channel is opened by the control valve 15 and the ring exterior lower cavity 8-5 is connected with the cavity 1-1 inside the housing 1. Water flows to the ring exterior lower cavity 8-5 from the cavity 1-1 and upward water pressure is offset by downward water pressure on the corresponding area of the second piston 8 between the large seal ring 8-3 outside the bottom part 8-1 of the second piston and the small seal ring 8-4 surrounding the central hole of the bottom part 8-1 of the second piston while the downward water pressure still exerts pressure on the second piston 8 area relative to the small seal ring 8-4 surrounding the central hole of the bottom part 8-1 of the second piston. When the downward water pressure exerted on the second piston 8 area relative to the small seal ring 8-4 surrounding the central hole of the bottom part 8-1 of the second piston is less than the upward acting force of the spring loading the second piston 9, the second piston 8 moves upwards to open the outfall and the water flows out of the outfall.

After the water is drained off for a certain time and the second piston 8 moves upward for a certain distance, the lower water pressure of the second piston 8 is offset by upper water pressure of the corresponding area and the second piston 8 accelerates moving upward under the action of a spring loading the second piston 9. When the drainage process is to be completed and transferred into the inflow process, the ring protuberance 4-5 contacts with the large seal ring of seal assembly of the second piston under the action of spring and generates preloading, bending and deformation for the large seal ring of seal assembly of the second piston.

Afterwards, the travel switch of water level 13 is reset and the water supply channel 11 and the water supplement channel 12 are opened. After drainage is completed, the first piston 4 moves downward to lower dead center under the thrust action of a spring loading the first piston 5 and the second piston 8 moves back to the lowest position under the effect of force M. The large seal ring of seal assembly of the second piston is preferably sealed over the small seal ring of seal assembly of the second piston under the acting force of preloading, bending and deformation so as to discharge water inside the ring exterior lower cavity out of the outfall successfully and complete a cycle of water supply and drainage. The fact that the large seal ring of seal assembly of the second piston is preferably sealed over the small seal ring of seal assembly of the second piston leads to the removal of defect of incomplete water drainage for the flushing mechanism of the prior art.

Figure 9:
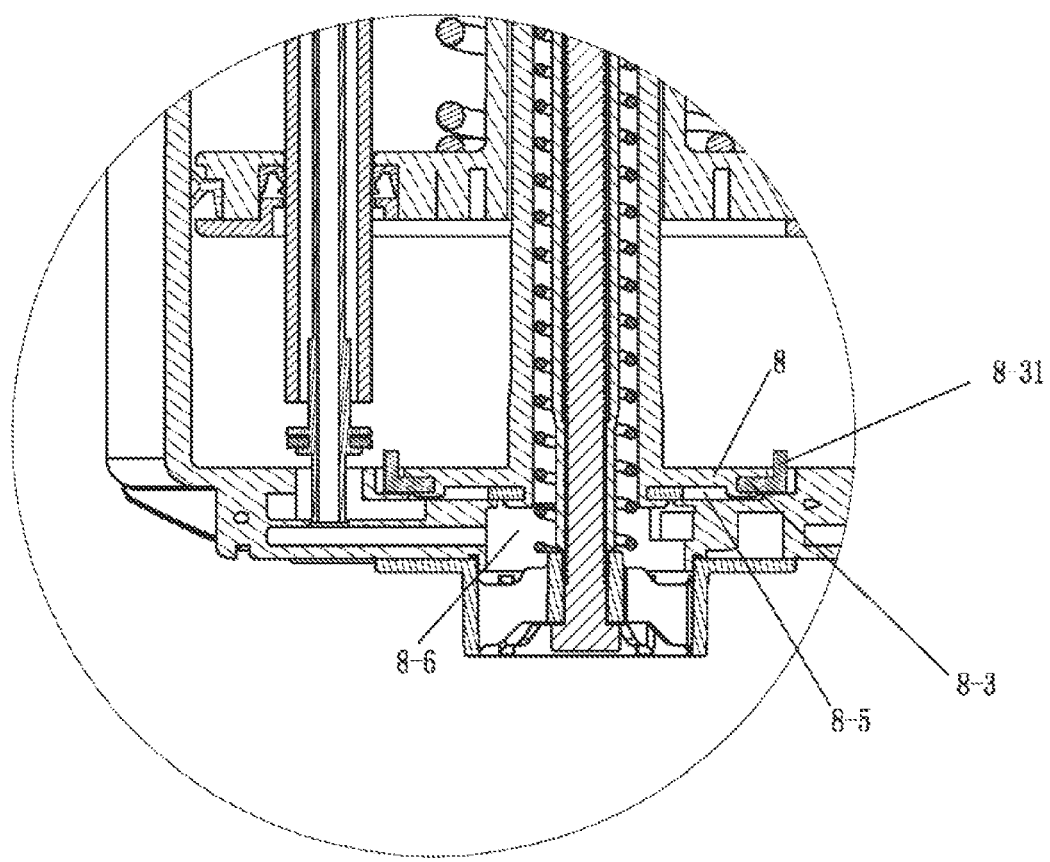

As shown in FIG. 9 of Embodiment 2, based on the design principle of realizing full sealing by preloading, bending and deformation of the seal assembly, the difference between Embodiment 2 and Embodiment 1 lies in that the edge of the large seal ring 8-3 is provided with an upward ring protuberance 8-31 (namely the profile of the large seal ring is L-shaped) and the lower part of the first piston 4 is flat surface; when the first piston 4 slides downward, the flat surface of the lower part presses the ring protuberance 8-31 at the edge of the large seal ring 8-3 to lead to preloading, bending and deformation. And the large seal ring 8-3 of the seal assembly of the second piston is preferably sealed over the small seal ring 8-4 of seal assembly of the second piston to ensure that water inside the ring exterior lower cavity 8-5 can be drained out of outfall successfully.

With reference to the specific embodiments, while the invention has been described in the statement and attached figures thereof, it will be understood by those skilled in the art that various changes may be made and equivalents may be substituted without departing from the scope of the invention as defined by the appended claims. And the combination and collocation of technical features, elements and/or functions between a plurality of specific embodiments is clear. Therefore, according to publicized contents, it will be understood by those skilled in the art that the technical features, elements and/or functions of Embodiments may be made adapt to a particular embodiment, unless contrary description is given in the contents. In addition, many modifications may be made to adapt a particular situation or material to the teachings of the invention without departing from its scope. Therefore, it is intended that the invention not be limited to the particular embodiment disclosed illustrated in the attached figures as well as to the preferred embodiment assumed by this invention, but that the invention will include all embodiments falling within the scope of the above statement and the appended claims.

INDUSTRIAL APPLICABILITY

A flushing mechanism is characterized by tactical design, simple structure, convenient operation and good industrial applicability and realizes the purpose of full sealing by preloading, bending and deformation of seal assembly.

The invention claimed is:
1. A flushing mechanism, comprising:
a housing having a housing wall and a housing bottom connected to the housing wall, the housing wall having a cylindrical inner surface that surrounds an axis, the cylindrical inner surface defining an inner cavity;
an outfall provided on the housing bottom, surrounding the axis, and being connectable to a wash pipe;
a guide rod disposed along the axis, and being axially restrained relative to the housing;
a first piston that hermetically slips on the cylindrical inner surface and the guide rod at the same time along an axis direction, the first piston dividing the inner cavity into a lower cavity contacting with the housing bottom, and a relative upper cavity, a lower part of the first piston being provided with a ring protuberance;
a first spring loading the first piston, and being installed in the upper cavity and surrounding the guide rod, the first spring applying an elastic force on the first piston from the housing and driving the first piston to move downward, thus reducing a volume of the lower cavity and expanding a volume of the upper cavity;
a second piston that hermetically slips on the guide rod along the axis direction, and being located between the first piston and the housing bottom, the second piston having a seal assembly that includes a large seal ring surrounding an outboard of a bottom of the second piston, and a small seal ring located at a central part of the second piston;
a second spring loading the second piston and surrounding the guide rod, the second spring applying an elastic force on the second piston from the housing and driving the second piston to move upward; and
a control valve that comprises the seal assembly of the second piston and the ring protuberance of the first piston, the ring protuberance configured to pass through an annular opening in the bottom of the second piston to contact the large seal ring of the seal assembly of the second piston, whereby when the first piston slips downward, the ring protuberance causes a preloading, bending and deformation of the large seal ring of the seal assembly of the second piston, the large seal ring of the seal assembly of the second piston sealing over the small seal ring due to the preloading, bending and deformation, thus facilitating water in a ring exterior lower cavity to flow out of the outfall.
2. The flushing mechanism as claimed in claim 1, wherein the ring protuberance forms an integral whole with the first piston.
3. The flushing mechanism as claimed in claim 1, wherein the lower part of the first piston is provided with a block bar having a through hole at a center thereof, a periphery of the through hole extending downward to form the ring protuberance.

4. The flushing mechanism as claimed in claim 1, further comprising a bypass extending from the control valve to the outfall and opening to the wash pipe.

5. The flushing mechanism as claimed in claim 1, wherein the first piston comprises a top part that surrounds the guide rod and hermetically slips along the guide rod along the axis direction, and a cylindrical part that connects the top part and the lower part of first piston into a whole, the first spring surrounding the cylindrical part of the first piston and directly contacting a bottom of the first piston to apply the spring force.

6. The flushing mechanism as claimed in claim 1, wherein the second piston further comprises a bottom part and a top part, the top part of the second piston hermetically slips on the guide rod and surrounds the guide rod, the second piston further comprising a cylindrical part that connects the top part and the bottom part of the second piston into a whole, the cylindrical part of the second piston being insertable into a cylindrical part of the first piston from the lower cavity, the second spring being located between the guide rod and the cylindrical part of the second piston.

7. The flushing mechanism as claimed in claim 1, wherein the first spring comprises a coil spring, and wherein the guide rod comprises a sleeve that has an axial screw hole, and a screw that can be screwed in to the screw hole, wherein when one end of the screw is screwed into the screw hole from one end of the sleeve, another end of the screw and the sleeve push and block two ends of the coil spring, which is sleeved over the sleeve and the screw respectively, the coil spring transforming from a relaxed state, to a compressed state, by screwing the screw into the sleeve.

\* \* \* \* \*